Figure 4:
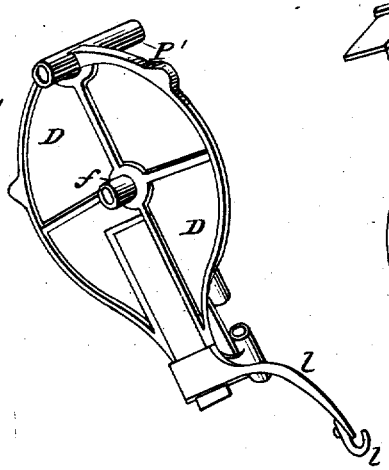

2 Sheets—Sheet 1.
R. DUTTON.
Harvester.
No. 4,139.
Reissued Oct. 4, 1870.
Fig. 1.
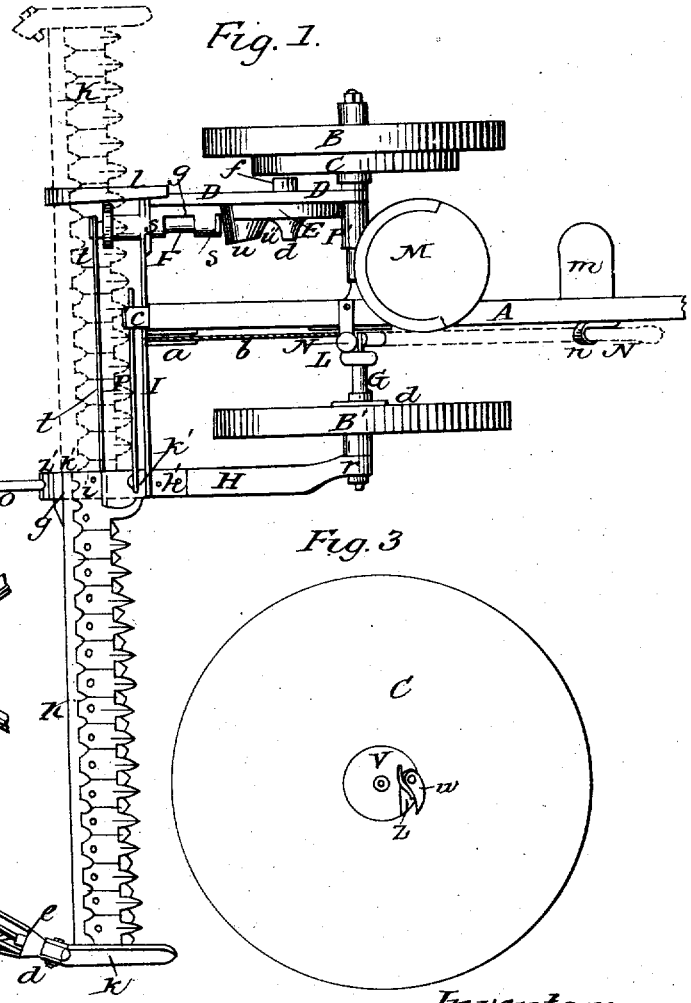
Fig. 2.
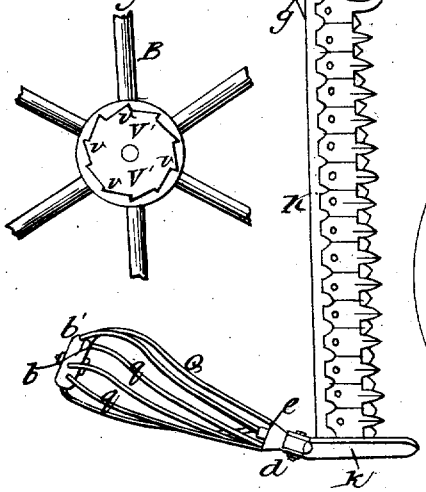
Fig. 3
Witnesses:
John A. Tauberschmidt.
John P. C. Drewkert
Inventor:
Rufus Dutton
By James Densmore
Agent.
N. PETERS, Photo-Lithographer, Washington, D. C.

R. DUTTON.

2 Sheets—Sheet 2.

Harvester.

No. 4,139.

Reissued Oct. 4, 1870

Witnesses:
John A. Tauberschmidt,
John T. B. Prankert.

Rufus Dutton,
By James Densmore
Agent.

N. PETERS, Photo-Lithographer, Washington, D. C.

UNITED STATES PATENT OFFICE.

RUFUS DUTTON, OF YONKERS, NEW YORK.

IMPROVEMENT IN HARVESTERS.

Specification forming part of Letters Patent No. 31,709, dated March 19, 1861; reissue No. 1,762, dated September 13, 1864; reissue No. 4,139, dated October 4, 1870.

DIVISION A.

*To all persons whom it may concern:*

I, RUFUS DUTTON, formerly of Dayton, Ohio, and now of Yonkers, New York, have invented Improvements in Mowing and Reaping Machines.

The accompanying drawing and following description, with the specifying letters thereof, fully illustrate the invention.

A mowing-machine and various detached parts thereof, embodying the invention, are represented in the drawing, of which—

Figure 5:
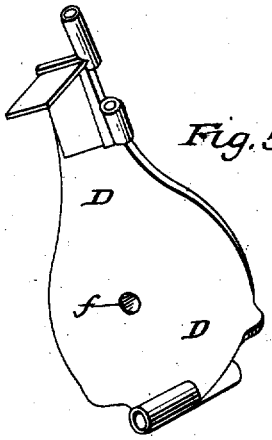
Figure 9:
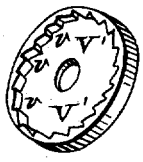
Figure 8:
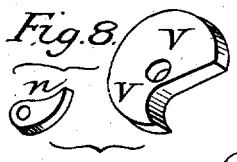
Figure 6:
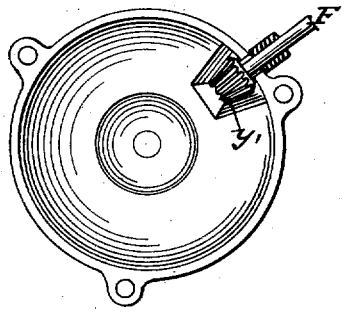
Figure 7:
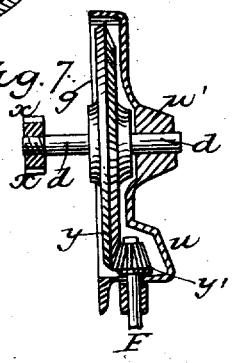

Figure 1 represents a top view of the machine. Fig. 2 represents a view of a series of ratchet-teeth in a recess in the inner end of the hub of the main driving-wheel, next to the main gear-wheel. Fig. 3 represents a view of a ratchet and spring on the outer end of the hub of the main gear-wheel, which go within the recess and ratchet-teeth of the main driving-wheel, and which couple the wheels together. Fig. 4 represents a view of the outer side of the flat casing-plate of the inclosing box or case. Fig. 5 represents a view of the inner side of the flat casing-plate of the inclosing box or case. Fig. 6 represents a view of the inner side of the hollow casing-plate of the inclosing box or case, with the bevel-pinion gear-wheel therein. Fig. 7 represents a sectional view of the inclosing box or case, with the secondary gear-wheels therein. Fig. 8 represents a perspective view of the circular base end of the ratchet, and of the circular socket in which the ratchet rests. Fig. 9 represents a perspective view of the recess in the side of a driving-wheel or gear-wheel, and of the ratchet-teeth therein.

The drawing represents the invention and the separate parts thereof, and it also represents many things common to all kindred machines, and the description explains the devices of the drawing. But the application of this division relates to a box or case, which incloses and protects the secondary gear-wheels, and makes, practically, the main frame of a mowing or reaping machine; and the nature of that part of the invention included in this division is a single metal casing-plate, separate and apart from any driving or carrying wheel, which plate supports the journals of the crank-wheel axle, and is practically the main frame, and also makes one side or main part of a box or case, which incloses and protects the secondary gear-wheels of a mowing or reaping machine.

The following is the description: A represents a draft-tongue, hinged on the main axle, with the hind end extended back over the hind end of the main frame. B represents a main driving-wheel, attached to the main axle, on the left side of the machine. B′ represents an auxiliary driving-wheel, attached to the main axle on the right side of the machine. C represents a main gear-wheel on the main axle, next to the main driving-wheel B. D represents a wide, solid metal casing-plate, and a main side or bar of the main frame, attached to the main axle, and extended back beyond the line of the hind part of the driving-wheels B B′. E represents a hollow, shell-like, solid metal casing-plate, attached to the main flat metal casing-plate D, on the side next to the auxiliary driving-wheel B′. G represents a main axle, rigidly attached to the main gear-wheel C, and through, and loosely within, the two driving-wheels B B′. F represents a crank-wheel axle, at a right angle to the main axle G, and alongside of, and parallel with, the hind part of the main-frame casing-plate D. H represents a minor bar of the main frame, hinged to the end of the main axle G, outside of the auxiliary driving-wheel B′, and extended back parallel with the flat main-frame plate D, behind the line of the hind part of the driving-wheels B B′, with the hind end bent to the ground for a finger-bar shoe. I represents a cross-bar of the main frame, parallel with the main axle G, and attached to the hind end of the main bar D and hind part of the minor bar H, with the contiguous end bent down to the minor bar. L represents a wheel-segment, hinged to the main axle G between the draft-tongue A and the auxiliary driving-wheel B′. M represents a seat for the operator, attached to the draft-tongue A, over the main axle G. N represents a lever, attached to the wheel-segment L, and extended radially within convenient reach of the operator in the seat M. P represents another lever, pivoted, over the finger-bar, to an attachment of the minor bar H, and extended, parallel with the cross-bar I, toward the main plate D, and under the hind end of the draft-tongue A. P′ represents a collar or sleeve, integrally a part of or rigidly attached to the main-frame casing-plate D, and loosely over the main axle G, next to the main gear-wheel C, whereby the inclosing box or case and the main plate of the main frame are hinged to the main axle. V′ represents a recess in the end of the hub of the main driving-wheel B, next to the main gear-wheel C. V represents an end of the hub of the main gear-wheel C, fitted to go within the recess V′ of the main driving-wheel B. *a* represents a pulley, attached to the draft-tongue A over the cross-bar I, and on the side next to the auxiliary driving-wheel B′. *b* represents a cord or chain, attached to the cross-bar I and wheel-segment L, and put over the pulley *a*. *d* represents a secondary gear-wheel axle, through the main and minor casing-plates D E, and parallel with the main axle G. *d′* represents a ratchet-plate, rigidly attached to the main axle G, next to the auxiliary driving-wheel B′. *f* represents a tubular hub, integrally a part of or rigidly attached to the main casing-plate D, on the side next to the main gear-wheel C, for the outer journal-bearing, or to receive and support the outer journal-bearing for the secondary gear-wheel axle *d*. *g′* represents a journal-bearing arm and brace, bent at a right angle, one side longer than the other, and the short side parallel with the main axle D, and the long side parallel with the crank-wheel axle F, and rigidly attached to the cross-bar I, and integrally a part of or rigidly attached to the main plate D, to support journal-bearings for the crank-wheel axle, and to brace the corner of the combined main plate and cross-bar D I. *i* represents a connecting-piece or hinge-brace, attached to the hind end of the combined minor-frame bar and inner finger-bar shoe H. *k* represents a finger-bar, hinged to the connecting hinge-brace *i*, and projecting laterally to the right, and parallel with the main axle G. *k′* represents a lug or ear, attached to or bent up from each end of the hinge-brace *i*. *h* represents a pivot-pin, by which the fore fork or corner of the inner end of the finger-bar *k* is hinged to the fore lug *k′* of the hinge-brace *i*. *g* represents another pivot-pin, similar to the first pivot *h*, by which the hind fork or corner of the finger-bar is hinged to the hind lug *k′* of the hinge-brace *i*. *l* represents a catch or rest, on the hind end of the main plate D, for the finger to rest on when folded for transportation. *m* represents a foot-rest, attached to the draft-tongue A, for the operator when in the seat M. *r* represents a sleeve or collar, by which the minor bar H is hinged to the main axle G. *s* represents a sleeve or tubular collar, integrally a part of or rigidly attached to the inner fore corner and hind end of the supporting-brace arm *g′* of the main plate D, to support the journals of the crank-wheel axle F. *t* represents a pitman, pivoted to the finger-bar *k* and to the crank on the hind end of the bevel-pinion axle F. *u′* represents a tubular prolongation of the hollow of the shell-like casing-plate E, directly in line with the tubular hub or hole *f* of the main casing-plate D, to receive and support a journal of the inner end of the secondary gear-wheel axle *d*. *u* represents a lip or pocket, in the hind edge of the hollow casing-plate E. *v* represents a series of ratchet-teeth, in the perimeter of the recess V of the main driving-wheel B. *w* represents a pawl or ratchet, on the hub V of the main gear-wheel C, adapted to the ratchet-teeth *v* of the main driving-wheel B. *z* represents a spring, under the ratchet *w* on the hub V of the main gear-wheel C, which spring presses and holds the ratchet out against the ratchet-teeth *v* of the main driving-wheel B. *x* represents a main spur-pinion gear-wheel, which meshes into the main gear-wheel C, and is rigidly attached on the outer end of the secondary gear-wheel axle *d*. *y* represents a large bevel-gear wheel, on the secondary gear-wheel axle *d*, within and between the combined casing-plates D E. *y′* represents a small bevel-gear wheel, on the fore end of the crank-wheel axle F, in the pocket *u* of the hollow plate E, and between and within the combined casing-plates D E, and which small bevel-gear wheel meshes with the large bevel-gear wheel *y*.

The recess V′, in the side of the main driving-wheel B, goes over the hub V of the main gear-wheel C, with the ratchet *w* against a ratchet-tooth, *v*, and the ratchet and ratchet-teeth are so arranged that the driving-wheel, when moving forward, will clutch and drive the gear-wheel, but not when moving backward. A similar recess and series of ratchet-teeth are in the side of the auxiliary driving-wheel B′, and a similar ratchet is on the hub, or on the side of the ratchet-plate *d′*, of the sides facing each other, which ratchet and ratchet-teeth are so arranged, also, when the driving-wheel and ratchet-plate are coupled together, that the driving-wheel, when moving forward, will clutch and drive the ratchet-plate, and thereby drive the main axle G and the main gear-wheel C, but not when moving backward. In this way both driving-wheels will work together, and drive the gear-wheel when moving forward, but will work independently and loosely when either moves backward.

The combination of the main plate D with the minor bar H and cross-bar I makes the main frame D H I, of which the wide, stout, heavy plate D is the chief part, and the auxiliary minor and cross bars H I are only convenient stay-braces; for the auxiliary hollow plate E, and the main spur-pinion gear-wheel *x*, and secondary gear-wheels *y y′*, and secondary gear-wheel axle *d*, and crank-wheel axle F, and crank-wheel, and even the cross-bar I itself, are all attached to and held and supported and controlled by the same main plate; hence the main plate is in and of itself practically the main frame.

The hollow casing-plate E is attached to and supported by the wide, flat casing-plate D; hence the wide, flat plate is the main casing-plate, and the hollow plate is only the auxiliary or minor casing-plate of the inclosing box or case D E. Hence, as the main casing-plate D of the inclosing box or case D E and the main plate or bar D of the main frame D H I is one and the same casing-plate or frame-bar, so one side of the box or case forms a part of the main frame.

As the minor casing-plate E is bolted rigidly to and made practically a part of the main casing-plate D, which is hinged on the main axle G by the collar or sleeve P′, so the box or case D E, which incloses and protects the secondary gear-wheels *y y′*, is suspended or supported on the main axle; and the journal-bearing *f* of the main casing-plate D and the journal-bearing *u′* of the main casing-plate E, being in line with each other, and parallel with the main axle, will maintain at all times, relatively to the main axle and main gear-wheel C, one and the same position, no matter what strain is on the machine, nor how much it may tumble about over rough ground, and the journals of the secondary gear-wheel axle *d* will never bind, and the main spur-pinion *x* will always mesh properly with the main gear-wheel.

The following is a summary of that part of the invention included in this division:

I claim—

1. A single metal casing-plate, separate and apart from any driving or carrying wheel, which plate supports the journals of the crank-wheel axle, and a journal of a secondary gear-wheel axle, and also makes one side or main part of a box or case, which incloses and protects the secondary gear-wheels of a mowing or reaping machine, substantially as described.

2. A single metal casing-plate, separate and apart from any driving or carrying wheel, which plate makes one side or main part of a box or case, which incloses and protects the secondary gear-wheels, and which plate also, practically, makes the main frame of a mowing or reaping machine, substantially as described.

RUFUS DUTTON.

Witnesses:
JAMES DENSMORE,
JOHN A. TAUBERSCHMIDT.